United States Patent
Torgalsbøen et al.

(10) Patent No.: US 12,492,947 B2
(45) Date of Patent: Dec. 9, 2025

(54) SENSOR NETWORK

(71) Applicant: AIRMONT AS, Halden (NO)

(72) Inventors: Ole Christian Torgalsbøen, Halden (NO); Morgan Kjølerbakken, Halden (NO); Karl-Magnus Haugen, Halden (NO)

(73) Assignee: AIRMONT AS, Halden (NO)

( * ) Notice: Subject to any disclaimer, the term of this patent is extended or adjusted under 35 U.S.C. 154(b) by 567 days.

(21) Appl. No.: 17/904,052

(22) PCT Filed: Feb. 12, 2021

(86) PCT No.: PCT/EP2021/053463
§ 371 (c)(1),
(2) Date: Aug. 11, 2022

(87) PCT Pub. No.: WO2021/160806
PCT Pub. Date: Aug. 19, 2021

(65) Prior Publication Data
US 2023/0091398 A1 Mar. 23, 2023

(30) Foreign Application Priority Data

Feb. 12, 2020 (GB) ..................................... 2001898

(51) Int. Cl.
*G01K 3/04* (2006.01)
*F23J 11/00* (2006.01)
(Continued)

(52) U.S. Cl.
CPC ................. *G01K 3/04* (2013.01); *F23J 11/00* (2013.01); *F23J 99/00* (2013.01); *G01B 17/025* (2013.01);
(Continued)

(58) Field of Classification Search
CPC ...... F23J 11/00; F23J 2213/60; F23J 2213/70; F23J 99/00; G01B 17/025; G01K 1/14; G01K 2215/00; G01K 3/04; G08B 21/182
See application file for complete search history.

(56) References Cited

U.S. PATENT DOCUMENTS

| 2006/0105280 A1 | 5/2006 | Mcaward |
| 2009/0140060 A1* | 6/2009 | Stoner ................ G05D 23/1934 236/51 |

(Continued)

FOREIGN PATENT DOCUMENTS

| CN | 1714258 A | 10/2007 |
| CN | 101203073 A | 6/2008 |

(Continued)

OTHER PUBLICATIONS

EP 3312815—English Translation (Year: 2018).*
(Continued)

*Primary Examiner* — Michael J Dalbo
(74) *Attorney, Agent, or Firm* — Heslin Rothenberg Farley & Mesiti P.C.; George S. Blasiak, Esq.

(57) ABSTRACT

A sensor network system for determining a chimney maintenance schedule comprises a sensor unit (16) arranged for placement in or proximate to a chimney (6). The sensor unit comprises at least one sensor arranged to measure a parameter of the chimney (6) and use the measured parameter to generate chimney health data associated with the chimney (6). The sensor unit includes a transmission module arranged to transmit (20) the chimney health data to a remote analysis unit (18). The remote analysis unit (18) is arranged to receive chimney profile data associated with the chimney (6) and to estimate a chimney health level associated with the chimney (6) from the respective chimney health data and chimney profile data. The remote analysis unit (18) deter- (Continued)

mines the chimney maintenance schedule from the estimated chimney health level.

17 Claims, 6 Drawing Sheets

(51) Int. Cl.
  *F23J 99/00* (2006.01)
  *G01B 17/02* (2006.01)
  *G01K 1/14* (2021.01)
  *G08B 21/18* (2006.01)

(52) U.S. Cl.
  CPC ............. *G01K 1/14* (2013.01); *F23J 2213/60* (2013.01); *F23J 2213/70* (2013.01); *G01K 2215/00* (2013.01); *G08B 21/182* (2013.01)

(56) References Cited

U.S. PATENT DOCUMENTS

| | | | |
|---|---|---|---|
| 2009/0302996 A1* | 12/2009 | Rhee | H02J 13/00028 340/3.32 |
| 2011/0017197 A1* | 1/2011 | Michailoff | F24B 1/187 126/502 |
| 2014/0069474 A1* | 3/2014 | Forde | B08B 9/027 134/56 R |
| 2017/0169683 A1* | 6/2017 | Ryder | G01J 5/0846 |
| 2017/0184315 A1 | 6/2017 | Nolan et al. | |
| 2018/0224143 A1* | 8/2018 | Anderson | F24F 11/30 |
| 2019/0251520 A1 | 8/2019 | Bently, III et al. | |
| 2019/0339688 A1 | 11/2019 | Cella et al. | |
| 2019/0351267 A1* | 11/2019 | Gantos | F23J 99/00 |

FOREIGN PATENT DOCUMENTS

| | | |
|---|---|---|
| CN | 204 853 518 A2 | 12/2015 |
| CN | 204 853 518 U | 12/2015 |
| DE | 33 02 407 A1 | 7/1984 |
| DE | 33 02 407 A2 | 7/1984 |
| DE | 102013220646 A1 | 4/2015 |
| DE | 102013220646 A2 | 4/2015 |
| JP | 2010249509 A | 11/2010 |
| JP | 2013122338 A | 6/2013 |
| JP | 2017040456 A | 2/2017 |
| KR | 101955493 B1 | 5/2019 |
| SE | 531849 C2 | 8/2009 |
| WO | WO 2010/084296 A2 | 7/2010 |
| WO | WO 2012/049226 | 4/2012 |

OTHER PUBLICATIONS

JP 2008282181—English Translation (Year: 2008).*
European Patent Office Examination issued in EU Application 21705493.1, dated Nov. 5, 2024. 5 pages.
Notification of Transmittal of the International Search Report and the Written Opinion of the International Searching Authority, of the Declaration; Application No. PCT/EP2021/053463, mailed Jun. 16, 2021, 19 pages.
Combined Search and Examination Report under Sections 17 and 18(3); Application No. GB2001898.2; mailed Mar. 17, 2020; 11 pages.
Japan Patent Office, Notice of Allowance in corresponding JP Application 2022-549231, dated Jun. 3, 2025. 3 pages (w/translation).
List of Foreign References with Translations, dated Jul. 2, 2025. 2 pages.
China National Intellectual Property Administration, First Office Action in common CN Application 202180021086.4 mailed Apr. 22, 2025. 19 pages (w/translation).
List of Foreign References with Translations, dated Jun. 9, 2025. 2 pages.

* cited by examiner

SENSOR NETWORK

CROSS REFERENCE TO RELATED APPLICATIONS

This application is a national stage filing under section 371 of International Application No. PCT/EP2021/053463 filed on Feb. 12, 2021 and published on Aug. 19, 2021 as WO2021/160806 A1, which claims priority to United Kingdom Application No. 2001898.2 filed on Feb. 12, 2020. The entire contents of WO2021/160806 A1 are hereby incorporated herein by reference.

TECHNICAL FIELD

The present invention relates to a sensor network, in particular a networked sensor system for assessing the maintenance requirements of one or more chimneys.

BACKGROUND TO THE INVENTION

Many buildings, particularly residential buildings such as houses and apartments, are provided with a chimney for the exhaust of gas and smoke produced by a source such as a fireplace, boiler, stove, incinerator, or similar. Typically a chimney is a substantially vertical architectural structure within or on the side of the building that routes the gases and smoke out of the building through a flue that runs through the length of the chimney from the source of the exhaust to the outside world. The chimney also provides an air intake path to provide air for combustion within the source.

As well as residential buildings, chimneys may be provided on commercial and industrial buildings, where such chimneys may be subject to more 'heavy duty' use. It is estimated that there are nearly 2 million chimneys in Norway, more than 7 million chimneys in the Nordic region, and more than 240 million chimneys across Europe.

Over time, pollutants and contaminants build up on the inside of the chimney, around the periphery of the flue. This unwanted build-up can pose a fire hazard and can impede the proper function of the chimney, i.e. inhibiting or preventing proper flow of gases through the flue. Prevention of airflow also increases the risk of harmful gases such as carbon monoxide escaping into the building.

For example, when wood is used as the fuel that is burned in the combustion process, creosote can build up on the interior walls of the chimney (i.e. around the flue), which reduces the cross-sectional area of the flue and thereby inhibits flow. Furthermore, as these creosote deposits are flammable, there is a risk of fire resulting from ignition of the deposits.

It is therefore important that ongoing cleaning and maintenance of each chimney is carried out in order to prevent build-up of contaminants. Such maintenance may involve an inspection of the chimney and cleaning the inside of the chimney, sometimes referred to as sweeping the chimney. It is generally recommended that chimneys are cleaned and inspected annually, and some countries make regular inspection and cleaning of chimneys mandatory.

Such inspection and cleaning may be carried out by a private chimney sweep, or may be carried out by a public organisation. In some countries such as Norway, inspection and cleaning of chimneys is the responsibility of the fire department and thus forms a public service.

The Applicant has appreciated, however, that usage of chimneys varies significantly. Some people make far more extensive use of their chimney than others, who may not even use it at all. Similarly, the amount and type of fuel being burned will also have a significant impact on the build-up of material within the flue and the type of material being built up. For example, wood may be more likely to leave creosote on the flue walls, whereas natural gas may burn more cleanly, leaving very little residue. Moreover, some people may frequently burn fuel, e.g. as a primary means to heat their home, while others may mostly rely on another heating system, such as a central heating system that uses a gas boiler or an electric boiler, and may only occasionally use a fireplace, e.g. for creating a warm or cozy atmosphere in their home.

However, regardless of usage, there will generally be some build-up of material over time simply due to the flue's exposure to the outside environment, e.g. particles in the air and/or debris (e.g. leaves from trees) may build up in a chimney over time, even if the chimney itself is not used often.

While a regular maintenance schedule may be used, for example where the chimney is inspected and cleaned annually (or at some other frequency), the Applicant has appreciated that it would be advantageous to make more efficient uses of resources by scheduling chimney maintenance only when necessary. In particular, a chimney that is not used very often and is not subject to much build-up may be able to wait longer for maintenance while another chimney that is prone to build-ups of material may need more regular maintenance.

SUMMARY OF THE INVENTION

When viewed from a first aspect, the present invention provides a sensor network system for determining a chimney maintenance schedule, the sensor network comprising:
- a sensor unit arranged for placement in or proximate to a chimney, wherein the sensor unit comprises at least one sensor arranged to measure a parameter of the chimney and use said measured parameter to generate chimney health data associated with said chimney, said sensor unit further comprising a transmission module arranged to transmit said chimney health data; and
- a remote analysis unit comprising a reception module arranged to receive the chimney health data, said remote analysis unit being arranged to receive chimney profile data associated with the chimney;
- wherein the remote analysis unit is arranged to estimate a chimney health level associated with the chimney from the respective chimney health data and chimney profile data;
- wherein the remote analysis unit determines the chimney maintenance schedule from the estimated chimney health level.

The first aspect of the invention extends to a sensor unit arranged for placement in or proximate to a chimney, wherein the sensor unit comprises at least one sensor arranged to measure a parameter of the chimney and use said measured parameter to generate chimney health data associated with said chimney; and a transmission module arranged to transmit said chimney health data to a remote analysis unit.

The first aspect of the invention also extends to a method of operating a sensor network system for determining a chimney maintenance schedule, the sensor network comprising a sensor unit comprising at least one sensor and a transmission module, and a remote analysis unit comprising a reception module, the method comprising:
    measuring a parameter of the chimney using the sensor;

using said measured parameter to generate chimney health data associated with said chimney;
transmitting said chimney health data using the transmission module;
receiving the chimney health data using the reception module;
receiving chimney profile data associated with the chimney;
estimating a chimney health level associated with the chimney from the respective chimney health data and chimney profile data; and
determining the chimney maintenance schedule from the estimated chimney health level.

The first aspect of the invention further extends to a non-transitory computer-readable medium comprising instructions that, when executed by a processor, cause the processor to carry out a method of operating a sensor network system for determining a chimney maintenance schedule, the sensor network comprising a sensor unit comprising at least one sensor and a transmission module, and a remote analysis unit comprising a reception module, the method comprising:
measuring a parameter of the chimney using the sensor;
using said measured parameter to generate chimney health data associated with said chimney;
transmitting said chimney health data using the transmission module;
receiving the chimney health data using the reception module;
receiving chimney profile data associated with the chimney;
estimating a chimney health level associated with the chimney from the respective chimney health data and chimney profile data; and
determining the chimney maintenance schedule from the estimated chimney health level.

Thus it will be appreciated that embodiments of the present invention provide a system in which a sensor located in or proximate to a chimney sends data relating to a measured parameter of the chimney to a remote analysis unit. The remote analysis unit takes the data received from the sensor unit and a chimney profile and determines the health of the chimney, i.e. the operational state of the chimney, in order to determine whether maintenance is required and/or when maintenance should be scheduled for. The chimney profile data corresponds to information known about the chimney a priori, i.e. it is pre-existing data rather than dynamic data from the sensors, examples of which are described in further detail below. Both the dynamic data from the sensor unit and the pre-existing profile data are both fed into the remote analysis unit which may use a suitable model to determine if and when maintenance of the chimney is required.

For example, the remote analysis unit may determine from the chimney health data and chimney profile data that the chimney has more than an acceptable level of contaminants and that urgent maintenance is required. Conversely, the remote analysis unit may determine that the chimney is currently relatively clean and that cleaning will not be required for some time, such that the chimney maintenance schedule may be set such that maintenance isn't scheduled for, by way of example only, six months.

The sensor unit may include one or more different types of sensors that each measure parameter(s) relating to the chimney. In some embodiments, the sensor unit comprises a temperature sensor arranged to measure a temperature of the chimney. The temperature sensor may measure an instantaneous temperature of the chimney.

The parameter of the chimney may therefore, in some embodiments, comprise a temperature of the chimney. This temperature may be the temperature of the gases and/or smoke at some point in the flue of the chimney. Additionally or alternatively, the temperature sensor may measure a temperature of a component of the chimney itself, for example a temperature of the flue and/or a temperature of an external wall of the chimney.

Additionally or alternatively, the parameter may, in some embodiments, comprise a firing frequency. Those skilled in the art will appreciate that the term 'firing frequency' means how often the source (e.g. a stove, fireplace, etc.) to which the chimney is connected is fired up. The temperature sensor may determine this from the times at which the temperature increases, i.e. due to a fire being lit below the chimney. A chimney with a higher firing frequency may be subject to increased deposits on the flue walls compared to a chimney with a lower firing frequency.

In some potentially overlapping embodiments, the parameter may comprise a firing intensity. Those skilled in the art will appreciate that the term 'firing intensity' means how hot the source is when lit. The temperature sensor may determine this from the magnitude of the temperature at times when the temperature increases, i.e. due to a fire being lit below the chimney. The Applicant has appreciated that, for example, the build-up of contaminants on the flue walls may correlate with the firing intensity.

In further potentially overlapping embodiments, the parameter may comprise a temperature profile over a time period. The temperature profile provides an indication of the rate at which the temperature changes when a fire is lit below the chimney, and may be indicative of the current build-up of contaminants within the flue.

The temperature profile may therefore provide an indication of the 'trajectory' of the temperature over time, and the temperature profile may, in some embodiments, comprise a plurality of temperature measurement points during the time period. The 'shape' of the profile may be indicative of the current condition of the chimney, i.e. the shape of the curve when the temperature is plotted as a function of time.

The temperature profile may additionally or alternatively comprise a time derivative of the temperature, so as to provide a measure of the rate of change of the temperature, i.e. a measure of the 'steepness' of the time-temperature gradient. A plurality of time derivatives of the temperature may be taken. One or more second-order time derivatives of the temperature may additionally or alternatively be used in order to determine the 'acceleration' of the temperature in the flue (i.e. how quickly the rate of change itself is changing). Of course, further higher order time derivatives may be taken. Such time derivative(s) may be included as part of the temperature profile itself, or the temperature profile may include only the temperature measurements (i.e. the measured temperature at various points in time), where the time derivatives are determined separately, e.g. by the remote analysis unit, e.g. when estimating the chimney health level.

Similarly, the temperature profile may additionally or alternatively comprise a time integral of the temperature, i.e. the 'area under the curve' of a plot of temperature as a function of time. Alternatively, the time integral may be determined by the remote analysis unit, e.g. when estimating the chimney health level.

In some embodiments, the sensor unit comprises an ultrasonic sensor arranged to determine when a contaminant is present within the chimney and/or to measure a thickness of a contaminant within the chimney. By transmitting ultrasonic signals and receiving reflections of those signals, the ultrasonic transducer may determine whether a contaminant is present and/or how much of it there is. For example, by comparing the amplitude of the received signal to a threshold, the sensor unit may determine from the amount of reflection (and thus attenuation) the type of material that reflected the ultrasonic signal. Furthermore, the received amplitude and/or the round-trip time-of-flight (TOF) of the ultrasonic signals may indicate the thickness of the contaminant within the chimney. For example, the ultrasonic sensor may receive two reflected pulses, one reflected by the contaminant layer and another reflected by the flue wall, where the difference in time between the received reflections is proportional to the thickness of the contaminant layer. Additionally or alternatively, an ultrasonic sensor may be arranged to measure a flow and/or a temperature within the chimney.

The sensor unit may be placed in any convenient location to allow proper measurement of the parameter(s) that are used to determine the maintenance schedule. However, in some embodiments, the sensor unit is arranged to be mounted at the top of the chimney. In some potentially overlapping embodiments, the sensor unit is arranged to be mounted at least partially within a flue of the chimney.

In some embodiments, the sensor unit is battery powered. Providing the sensor unit with a battery may advantageously provide a convenient power source for the sensor unit that does not require a connection to a mains electricity supply, thereby avoiding any need to provide electrical wiring from the mains electricity supply to the chimney.

In some potentially overlapping embodiments, the sensor unit is connected to a solar power panel. A solar panel may be conveniently positioned on the roof of a house and therefore is well suited to powering the sensor unit. Such a solar panel may power the sensor unit directly, however it may additionally or alternatively charge a battery which serves to power the sensor unit.

Additionally or alternatively, the sensor unit may be connected to a piezoelectric cell, a thermal cell, a voltaic cell, and/or a radio frequency (RF) rectifier. Those skilled in the art will appreciate that an RF rectifier is a device that 'harvests' the power (i.e. from the electromagnetic energy) of RF signals that are present in the environment around the device.

It will be readily understood that the analysis unit is 'remote', i.e. it is a separate hardware device to the sensor unit. The analysis unit advantageously removes the need for the sensor unit itself to make any determinations and may also provide a centralized analysis function for a plurality of sensor units in the sensor network. Thus, in some embodiments, the sensor network comprises a plurality of sensor units each arranged for placement in or proximate to a respective chimney, wherein each sensor unit comprises at least one sensor arranged to measure a parameter of the respective chimney and use said measured parameter to generate respective chimney health data associated with said chimney, wherein each sensor unit further comprises a respective transmission module arranged to transmit said chimney health data to the remote analysis unit.

In some such embodiments, the remote analysis unit is arranged to receive the chimney health data from each sensor unit and to receive chimney profile data associated with the respective chimney, wherein the remote analysis unit is arranged to estimate a chimney health level associated with the respective chimney from the respective chimney health data and chimney profile data, wherein the remote analysis unit determines the chimney maintenance schedule from the estimated chimney health level. Thus the remote analysis unit may receive chimney health data corresponding to a number of different number of chimneys and determine a suitable maintenance schedule for each chimney. Each remote analysis unit may serve a wide geographic area, for example, a number of houses, an apartment block, a neighbourhood, a village, a town, a city, etc. The sensor network may, additionally or alternatively, comprise a plurality of remote analysis units, such that each remote analysis unit communicates with one or more sensor units.

While multiple chimneys may be located on a single building, in a particular set of embodiments the plurality of sensor units include two or more sensor units each arranged for placement in or proximate to a respective chimney on a different building. Thus, in some embodiments, the sensor network system comprises:

a first sensor unit arranged for placement in or proximate to a first chimney on a first building;
a second sensor unit arranged for placement in or proximate to a second chimney on a second building;
wherein each of said first and second sensor units respectively comprises at least one sensor arranged to measure a parameter of the respective chimney and use said measured parameter to generate chimney health data associated with said respective chimney, each sensor unit further comprising a transmission module arranged to transmit said chimney health data. As outlined below, the use of a distributed wireless communications network is particularly advantageous in arrangements where multiple sensor units are provided across multiple buildings.

In a set of such embodiments, the sensor network system comprises one or more further sensor units each arranged for placement in or proximate to a respective chimney on a respective further building, wherein said further sensor unit comprises at least one sensor arranged to measure a parameter of the respective chimney and use said measured parameter to generate chimney health data associated with said respective chimney, each further sensor unit further comprising a transmission module arranged to transmit said chimney health data.

In some embodiments, the transmission and reception modules are wireless communication modules. Using wireless communication between the sensor unit and the remote analysis unit advantageously means that no wiring is required for the exchange of data between these units. In some embodiments, the remote analysis unit is cloud based. It will be appreciated that being cloud-based means that the remote analysis unit is provided by on-demand computing resources, e.g. in a suitable data centre, such that the remote analysis unit comprises a server.

There are a number of wireless communication technologies suitable for providing for the exchange of data between the sensor unit and the remote analysis unit. In some embodiments, the wireless communication transmission and reception modules are arranged to communicate over a cellular network. A cellular network is a mobile network is a communication network distributed geographically over a number of 'cells', each cell being provided with at least one cellular network transceiver with which data is exchanged with the sensor unit and/or the remote analysis unit. In some embodiments, the cellular network comprises a cellular Internet of Things (IoT) network, non-limiting examples of which may be specified by the 3GPP standardisation body.

In a set of potentially overlapping embodiments, the wireless communication transmission and reception modules are arranged to communicate over a LoRa® communication link. Those skilled in the art will appreciate that LoRa® is a cellular-like wireless communication technology known in the art per se.

In some potentially overlapping embodiments, the wireless communication transmission and reception modules are arranged to communicate over a Bluetooth® communication link. Bluetooth® is a wireless communication standard that makes use of a relatively short-wavelength, ultra-high frequency (UHF) radio waves to exchange data, and generally operates at frequencies of around 2.4 GHz. In addition to 'classic' Bluetooth®, the term 'Bluetooth® communication link' as used herein should be understood to include other variants of the Bluetooth® standard including but not limited to Bluetooth Low Energy®.

In some potentially overlapping embodiments, the wireless communication transmission and reception modules are arranged to communicate over a Wi-Fi™ network. It will be appreciated that 'Wi-Fi™' is a family of wireless communication standards based on the IEEE 802.11 family of standards. The sensor units may, for example, be equipped with a Wi-Fi module that allows it to connect to a nearby Wi-Fi network, e.g. a domestic wireless network within the building to which the chimney belongs.

The communication network (e.g. of the types described above, including but not limited to wireless communication networks) may have any suitable topology, e.g. a star or tree network. However, in some embodiments, the sensor network comprises a mesh network. It will be appreciated that a 'mesh' network is a topology in which network nodes are connected (often directly) to as many other nodes in the network as possible and route data between themselves, generally with a view to routing the data as efficiently as possible. Thus in embodiments in which the sensor network comprises multiple sensor units, the sensor units may be arranged to provide 'peer-to-peer' communication amongst themselves to route chimney health data across the mesh network to the remote analysis unit.

It will be appreciated that, in a particular set of embodiments, the communication network comprises a wireless communication network that allows for communications at 'long range', e.g. using a 'low power wide area network' (LPWAN). This is distinct from 'short range' communications technologies such as Bluetooth® and Wi-Fi™. LPWAN technologies may, in some cases, be preferred over 'conventional' cellular communications technologies (e.g. 2 G, 3G, 4G) as they generally utilise lower power consumption, which is advantageous when the sensor units are installed in or proximate a chimney, where sourcing 'unlimited' power may be difficult and in which the sensor unit instead relies on a battery and/or an intermittent source of power (e.g. solar power).

Thus, in some embodiments, the wireless communication network comprises a building-to-building network. This is notably distinct from arrangements in which a local area network (LAN) is used for the exchange of communications over a small area such as within a particular building. The actual range required will, of course, depend on how close together the relevant buildings are, however in some embodiments the wireless communication network may have a communication range of at least 100 m, optionally of at least 500 m, further optionally of at least 1 km, yet further optionally of at least 2 km, still yet further optionally of at least 5 km.

The use of a long range communications network is particular beneficial where sensor units are distributed across a wide region, e.g. where sensor units are disposed in or proximate to chimneys located on completely different buildings, allowing a distributed network of sensor units to be spread across a wide area (e.g. across a town or city).

Examples of LPWAN technologies particularly well suited to use for communications between the sensor unit(s) and/or remote analysis unit(s) include: Long Term Evolution (LTE) Narrowband Internet of Things (NB-IoT); LoRa®; and Sigfox. For example, distances of several kilometres are achievable with LPWAN technologies. For example, NB-IoT has an approximate range of between 1 km (urban) and 10 km (rural), LoRa® has an approximate range of between 5 km (urban) and 20 km (rural), and Sigfox has an approximate range of between 10 km (urban) and 40 km (rural).

It will of course be appreciated that this list of suitable technologies is not exhaustive, and that other suitable technologies that allow for building-to-building communication may readily be used and fall within the scope of the present invention. Additionally, the ranges provided here are not necessarily intended as limitations on the scope of the invention, but instead to provide context as to the geographic extent that may be covered using such a sensor network system. As outlined above, the remote analysis unit receives chimney profile data associated with the chimney. This chimney profile data corresponds to information known about the chimney a priori, i.e. it is pre-existing data rather than dynamic data.

The chimney profile data may include information regarding what type of source is connected to the chimney, for example whether the chimney serves a fireplace, a stove, a boiler, an incinerator, etc. In practice, a single chimney may serve multiple purposes, where each of these may be represented in the chimney profile data (e.g. the profile data may indicate that a given chimney serves two fireplaces and a stove), The source information may include the model, age, size, service history, etc. relating to the source.

In some potentially overlapping embodiments, the chimney profile data comprises fuel information associated with the chimney. This may indicate what type of fuel is burned by the source(s) connected to the chimney, for example whether wood, coal, natural gas, or oil is being burned. This information may give an indication as to the types of contaminants that build up within the flue, the fire risk associated with the contaminant level for a given type of fuel being burned, and the expected rate of change of contaminant build-up.

In some further potentially overlapping embodiments, the chimney profile data comprises a sweeping history for the chimney. By taking into account the previous sweeping activity carried out for the chimney, a more informed analysis for the chimneys cleaning and maintenance needs may be carried out. For example, if large deposits of contaminants have been built-up despite a relatively recent sweeping of the chimney, this may indicate that the particular chimney experiences build-ups of contaminants at a faster-than-average rate and so it may require cleaning on a more frequent basis.

The chimney maintenance schedule may comprise an estimation of when the chimney should undergo its next maintenance, and may be a deadline or a time window. This information may be relayed to the owner of the chimney, to a building manager, or an organisation responsible for maintaining the chimney, e.g. a private company or a public body such as a fire department.

In addition to providing a maintenance schedule, the sensor network may, at least in some embodiments, generate an alarm when a difference between the estimated chimney health level and a target chimney health level exceeds a threshold value. For example, if it is determined that there is a greater build-up of contaminants within the flue than is deemed safe (e.g. there is a significant fire risk), an alarm may be raised indicating that urgent maintenance is required. This alarm may be raised by the remote analysis unit or a separate hardware unit, e.g. an emergency alarm unit.

In some embodiments, the sensor network system is arranged to generate an emergency alarm signal when the parameter of the chimney exceeds a threshold. For example, where a temperature is determined, an alarm may be generated when the temperature exceeds a threshold indicative of e.g. a household fire. Such an alarm may be used to sound an audible alarm inside the building (such as a bell, a sounder, or a siren), and/or it may be used to alert a suitable authority such as the fire brigade.

In some embodiments, the remote analysis unit is arranged to estimate an emission level from the chimney health data and/or the chimney profile data. Thus the system may be able to determine the emission profile of the source to which the chimney is connected. By way of example only, older ovens may release more particles than newer ovens. Similarly, an oven that burns pellets may produce less emissions than an oven that burns wood. Temperature measurements may provide information regarding firing frequency and/or firing intensity as outlined hereinabove. This information may be coupled with information on the age and/or model of the source (e.g. the oven or another type of source) to predict the emissions (e.g. particulate matter) being produced by the source.

In a particular set of embodiments, the remote analysis unit may be arranged to estimate a regional air quality level from the chimney health data and/or the chimney profile data associated with a plurality of sensor units. The applicant has appreciated that in a particularly advantageous set of embodiments, data may be acquired from multiple chimneys distributed across a particular geographic region (e.g. a number of houses, an apartment block, a neighbourhood, a village, a town, a city, a municipality, a county, a district, a country, etc.). This 'crowdsourced' data may then be used to make estimations about the regional air quality, both in terms of the current quality of the air, but also to predict future changes and trends in air quality for that geographic region. For example, if the usage of chimneys (e.g. firing intensity and/or frequency) is increasing in a particular region, it may be determined that there will likely soon be a negative impact on air quality, which may indicate preventative or mitigating measures should be taken proactively. Conversely, if many people appear to be switching to a less polluting fuel or decreasing their usage, a positive influence on air quality may be detected.

Thus, in some embodiments the sensor network comprises:
a first sensor unit arranged for placement in or proximate to a first chimney on a first building;
a second sensor unit arranged for placement in or proximate to a second chimney on a second building;
wherein each of said first and second sensor units respectively comprises at least one sensor arranged to measure a parameter of the respective chimney and use said measured parameter to generate chimney health data associated with said respective chimney, each sensor unit further comprising a transmission module arranged to transmit said chimney health data;
wherein the remote analysis unit is arranged to estimate a regional air quality level from the chimney health data and/or the chimney profile data received from each of said sensor units.

In a set of such embodiments, the sensor network comprises one or more further sensor units each arranged for placement in or proximate to a respective chimney on a respective further building, wherein said further sensor unit comprises at least one sensor arranged to measure a parameter of the respective chimney and use said measured parameter to generate chimney health data associated with said respective chimney, each further sensor unit further comprising a transmission module arranged to transmit said chimney health data, wherein the remote analysis unit is arranged to estimate the regional air quality level using the chimney health data and/or the chimney profile data received from said further sensor unit(s).

In some embodiments, the remote analysis unit is arranged to estimate a fire risk level from the chimney health data and/or the chimney profile data. Thus the system may determine, based on the data from the sensor unit and/or the prior knowledge afforded by the profile data, what the risk of a fire in the chimney is. This risk level may, for example, be (or be related to) a likelihood of a fire breaking out in the chimney. This fire risk level may be reported, e.g. to an authority or to the owner/resident of the building having the chimney. This may advantageously allow for proactive steps to be taken to manage the fire risk.

As outlined previously, the fire risk level may be determined based on the amount of contaminants that have built up on the walls of the flue. Additionally or alternatively, the fire risk level may be based on the firing intensity and/or firing frequency. For example, a detected increase in the usage of the fireplace may indicate a greater risk of fire.

It will be appreciated that the remote analysis unit may be a single hardware unit, but may also be a distributed system, where its various functions in accordance with embodiments of the present invention are carried across a plurality of different hardware units. Similarly, while in some embodiments the hardware components of the sensor unit may be contained within a common housing, other embodiments are envisioned in which one or more components of the sensor unit are separate pieces of hardware that are connected together so as to provide the functionality described herein with respect to embodiments of the present invention.

As outlined above, in some embodiments, the remote analysis unit may estimate an emission level and/or a regional air quality level from the chimney health data and/or chimney profile data. In some potentially overlapping embodiments, the sensor unit(s) in the sensor network may also be used to acquire information regarding the air quality in the area around the chimney. For example, a sensor unit may acquire environmental data, such as an air quality parameter, a concentration of one or more pollutants, a concentration of air particulates (e.g. particulates having a certain size or sizes). The sensor unit may comprise one or more suitable sensors for acquiring the associated environmental data. The environmental data may then be analysed to determine an air quality metric associated with an area around the sensor unit(s). This analysis may, for example, be carried out by the remote analysis unit.

BRIEF DESCRIPTION OF THE DRAWINGS

Certain embodiments of the present invention will now be described with reference to the accompanying drawings, in which.

DETAILED DESCRIPTION

Figure 1:
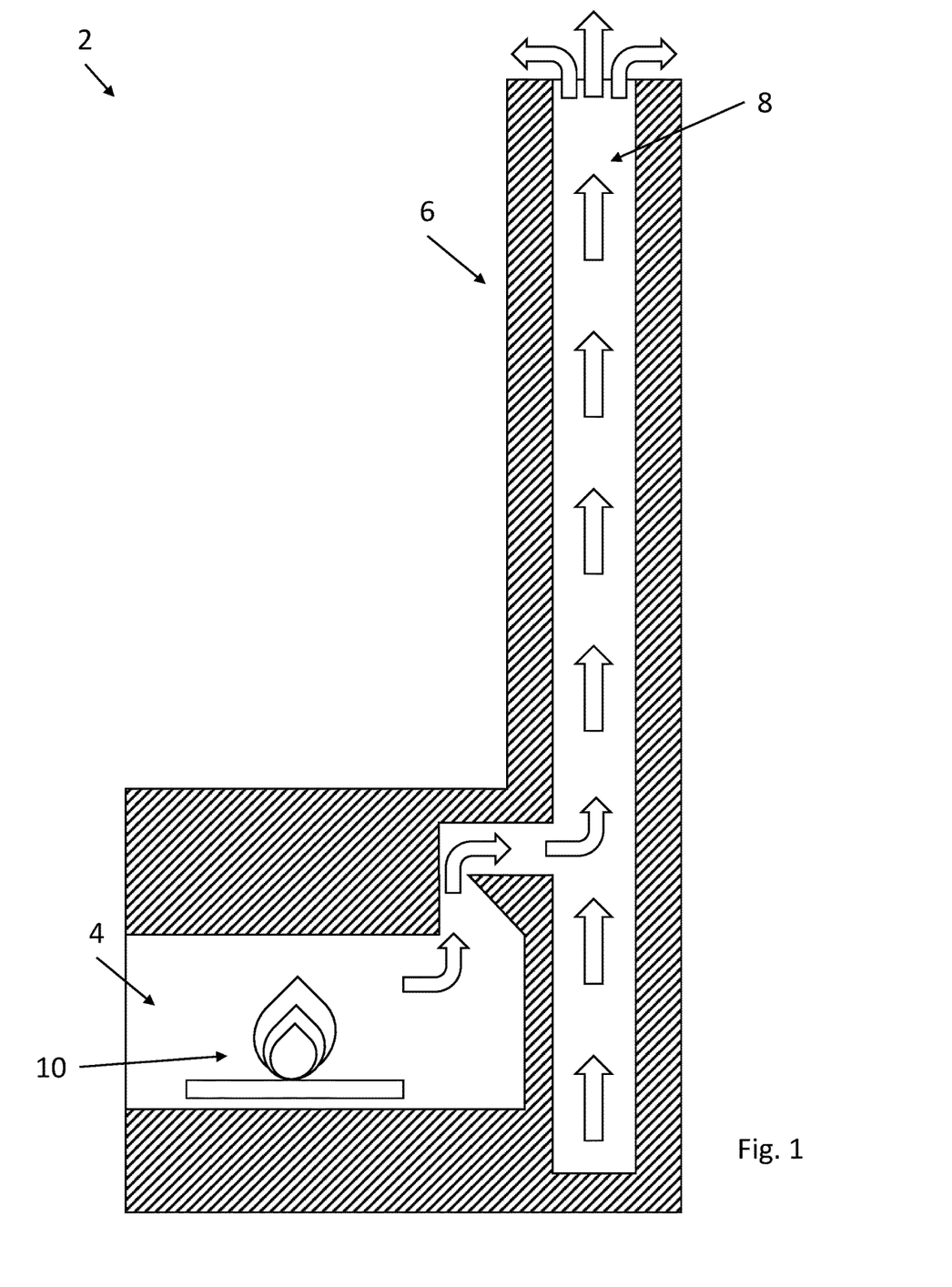
FIG. 1 is a schematic diagram showing a cross section of a prior art chimney arrangement.

FIG. 1 is a schematic diagram showing a cross section of a prior art chimney arrangement 2. The chimney arrangement 2, which may be located at the side of a residential building, comprises a fireplace 4 and a chimney stack 6 through which a flue 8 rises vertically.

The flue 8 provides a pathway for gases and smoke—generated by the fire 10 within the fireplace 4—to be exhausted from the fireplace 4 to the outside world as indicated by the arrows. The flue 8 also provides a pathway for the intake of air (i.e. in the opposite direction to the arrows in FIG. 1) for combustion within the fireplace 4, however air intake is not shown for ease of illustration.

Figure 2:
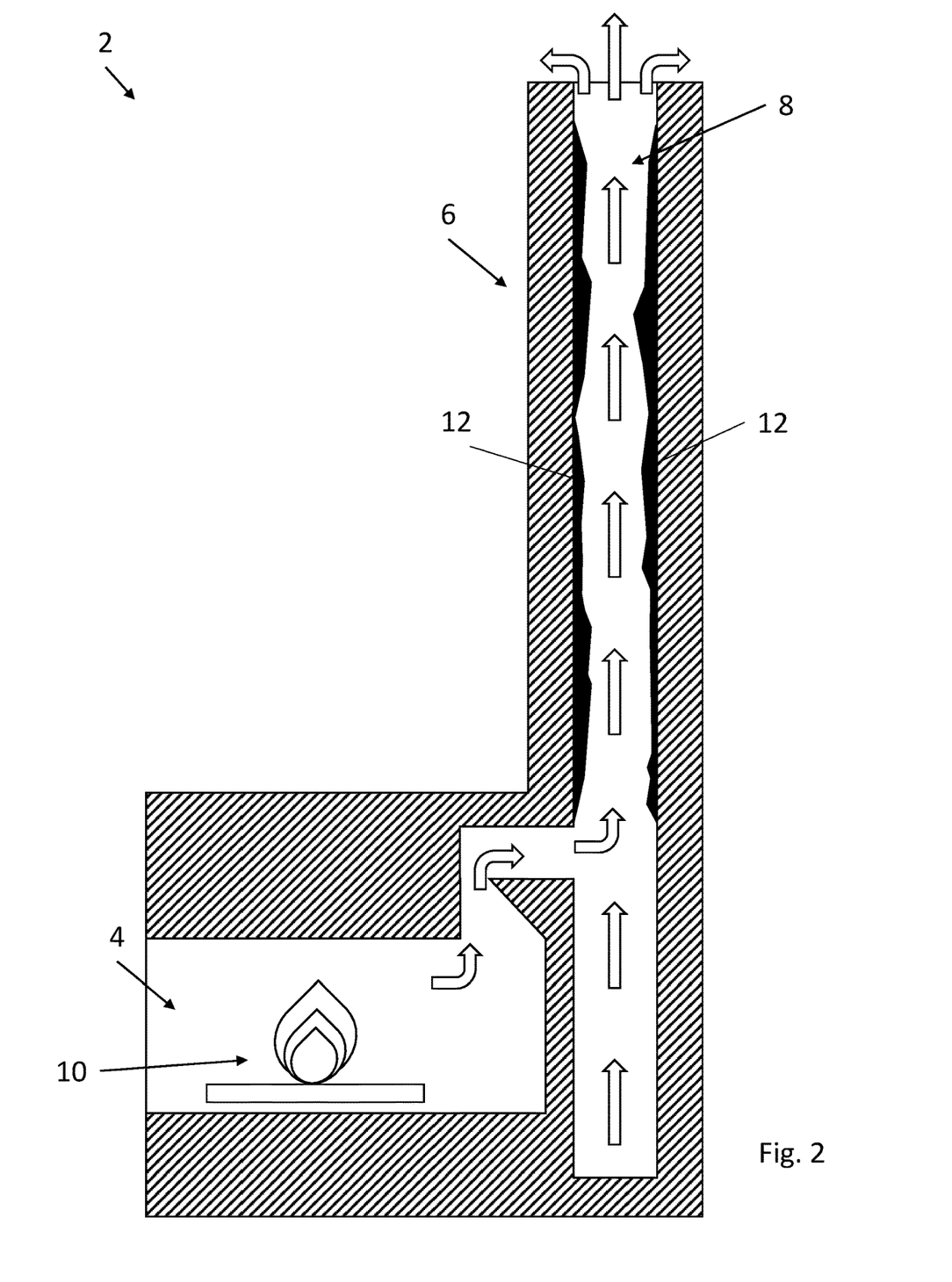
FIG. 2 is a further schematic diagram showing the chimney arrangement of FIG. 1 with a build-up of contaminants.

In this particular example, the fire 10 is the result of burning wood. However, as the wood burns, it leaves deposits of creosote 12 on the interior walls of the flue 8 as can be seen in FIG. 2. These deposits 12 build up over time and inhibit the flow of air through the flue 8, as indicated by the arrows being thinner than in FIG. 1. This build-up of creosote deposits 12 is hazardous because the deposits 12 themselves are flammable and thus may be subject to ignition, the result of which may be catastrophic (i.e., a house fire may occur).

In order to avoid such issues, the flue 8 of the chimney stack 6 must be regularly cleaned, e.g. once a year, to remove the deposits 12.

Figure 3:
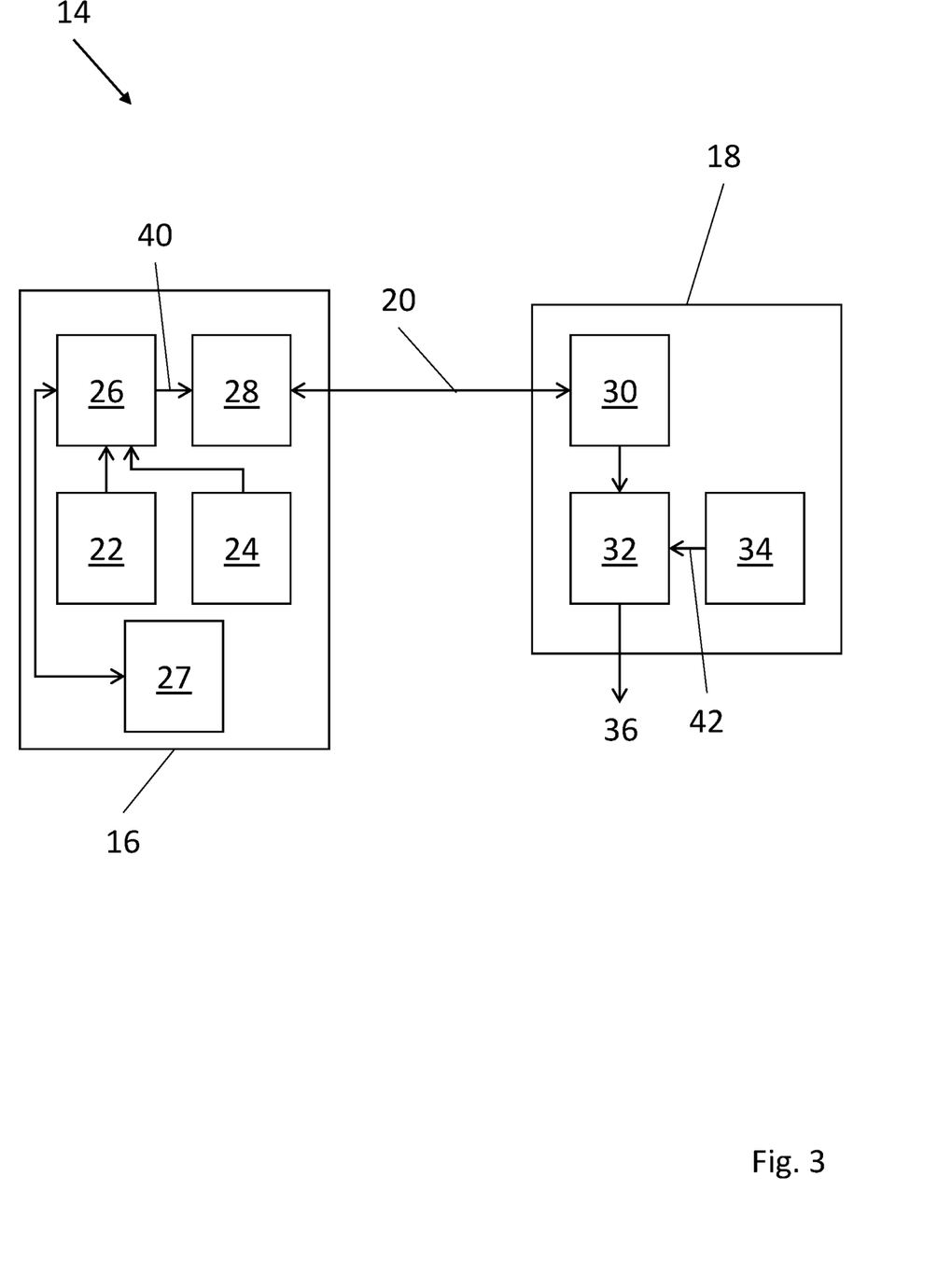
FIG. 3 is a block diagram of a sensor network in accordance with an embodiment of the present invention.

FIG. 3 is a block diagram of a sensor network 14 in accordance with an embodiment of the present invention. The sensor network 14 comprises a sensor unit 16 and a remote analysis unit 18, where the sensor unit 16 and the remote analysis unit 18 are arranged to communicate with one another over a wireless communication link 20. In this particular example, the a wireless communication link 20 is a cellular connection (i.e. it utilises a 'mobile network') but could additionally or alternatively be carried out using Bluetooth®, Bluetooth Low Energy®, Wi-Fi™ some other suitable wireless communication standard, or using a proprietary wireless communication scheme instead as appropriate, in accordance with the network conditions (e.g. range, signal-to-noise ratio, etc.).

In this example, the sensor unit 16 comprises a temperature sensor 22, an ultrasonic sensor 24, a processor 26, and a wireless transducer module 28.

Specifically, the wireless transducer module 28 is a cellular transducer module and is suitable for communicating over a cellular network in a manner known in the art per se. In order for the sensor unit 16 to report to the remote analysis unit 18, the wireless transducer module 28 could have only transmission functionality, however in this example it also has reception capabilities.

The processor 26 is arranged to buffer data in a memory 27, such that data is transmitted via the wireless transducer module 28 intermittently. This may provide power savings by allowing the sensor unit 16 to only 'wake up' from a low power mode at particular intervals to transmit the buffered data.

The remote analysis unit 18 comprises a wireless transducer module 30, a processor 32, and a memory 34. Similarly to the wireless transducer module 28 in the sensor unit 16, the wireless transducer module 30 of the remote analysis unit 18 is a cellular transducer module and while the wireless transducer module 30 could have only reception functionality, in this example it also has transmission capabilities.

The operation of the sensor unit 16 and the remote analysis unit 18 is described in further detail below.

Figure 4:
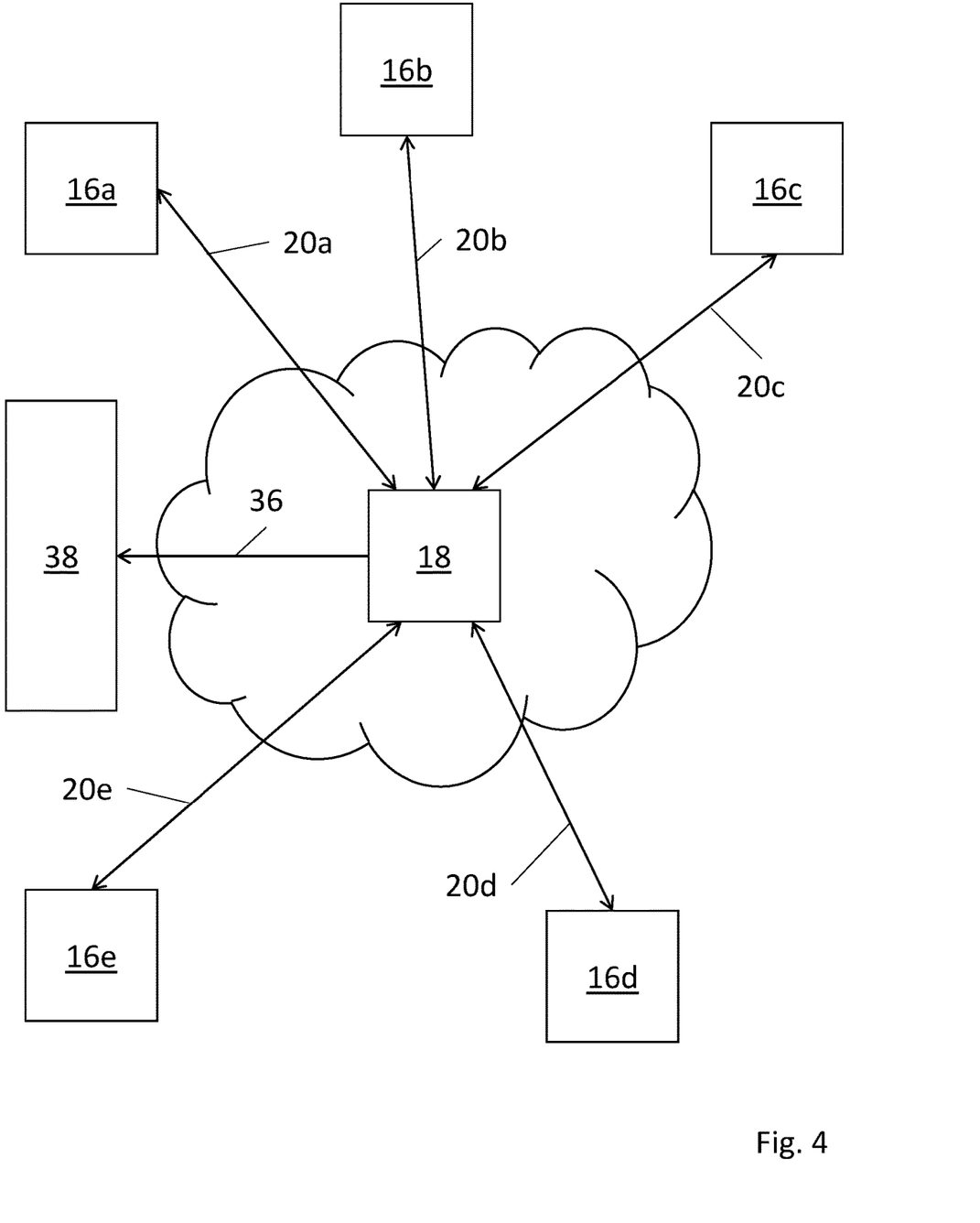
FIG. 4 is a schematic diagram showing a sensor network in accordance with an embodiment of the present invention.

FIG. 4 is a schematic diagram showing a network topology of the sensor network 14 of FIG. 3 in which multiple sensor units 16a-e are connected to the remote analysis unit 18 via respective wireless communication links 20a-e. In this embodiment, all of the wireless communication links 20a-e are cellular communication links, however different types of wireless communication links could be used, and embodiments are envisaged in which there are a mix of different wireless communication links such that some of the sensor units 16a-e use different wireless communication standards (and/or proprietary communication schemes) to others. Alternatively, wired communication links could be used in place of one or more of the wireless communication links 20a-e.

The chimney maintenance schedule 36 generated by the remote analysis unit 18 may, by way of example only, be provided to an external entity 38 such as a fire department, local authority, public body, private chimney monitoring organisation, etc.

Figure 5:
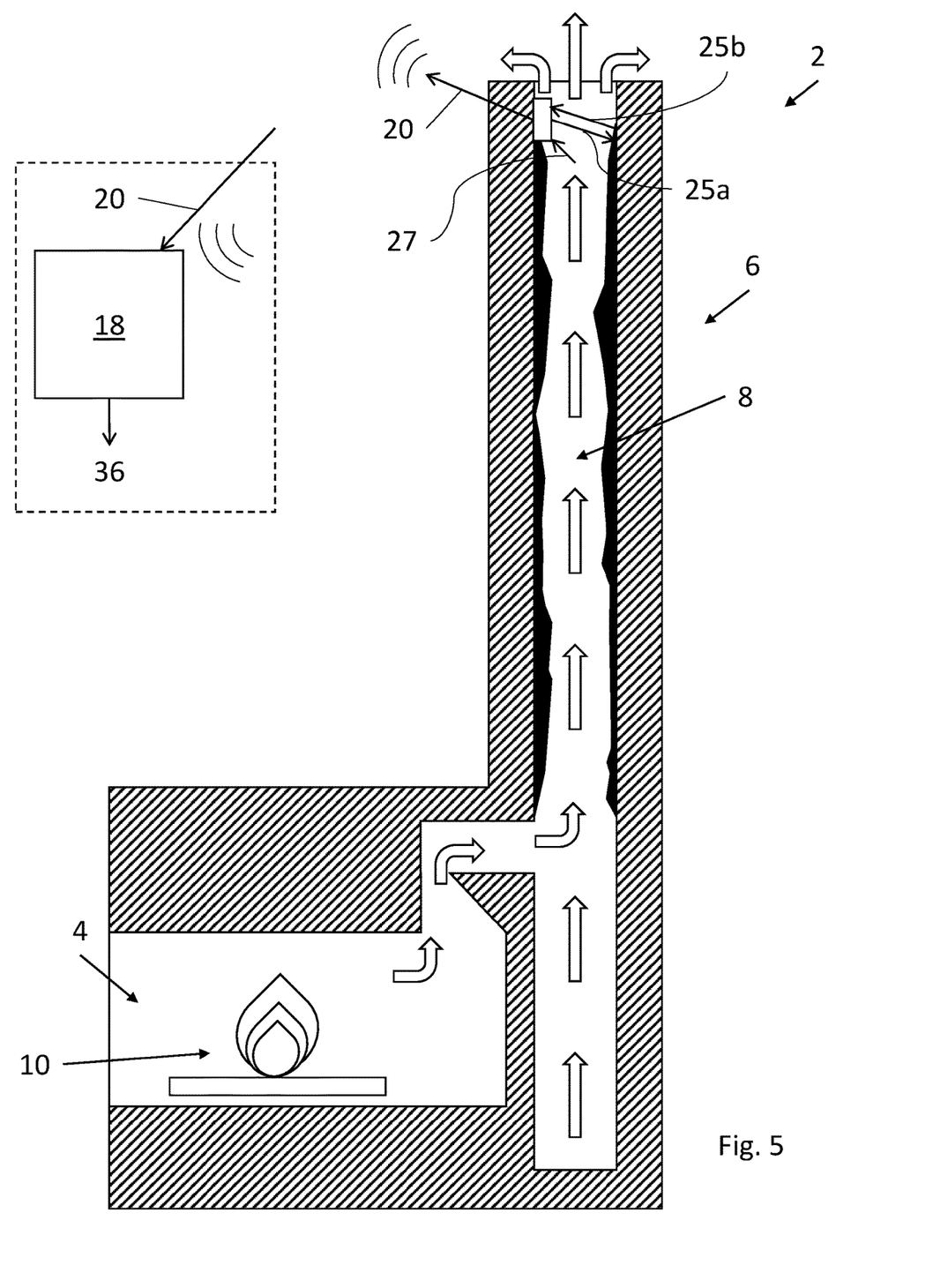
FIG. 5 is a schematic diagram showing a cross section of a chimney arrangement within the sensor network of FIG. 4.

FIG. 5 is a schematic diagram showing a cross section of a chimney arrangement 2 within the sensor network 14 of FIG. 4. The chimney arrangement 2 corresponds to the chimney arrangement of FIGS. 1 and 2, but has been provided with a sensor unit 16 that communicates with the remote analysis unit 18 in accordance with an embodiment of the present invention, where like reference numerals indicate like elements.

The temperature sensor 22 of the sensor unit 16 is arranged to measure a temperature 27 within the flue 8. By monitoring the temperature 27 over time, the firing frequency of the fire 10 (i.e. how often the fire 10 is lit), and firing intensity of the fire 10 (i.e. corresponding to how hot the fire 10 is) within the fireplace 4 can be determined. Furthermore, a temperature profile (i.e. a measure of how the temperature within the flue 8 changes over time) may be determined.

The ultrasonic sensor 24 is arranged to transmit ultrasonic signals 25a, for example ultrasonic pulses, and receive reflections 25b of the transmitted ultrasonic signals. The ultrasonic sensor 24 can determine from the received reflections 25b whether deposits 12 are present and what the thickness of the deposits 12 is. Where the build-up of deposits 12 is uneven, the measured thickness may be a 'spot test' providing a measure of thickness at one particular spot, however with the use of multiple ultrasonic sensors, multiple measurements may be taken such that a maximum thickness and/or an average thickness may be determined if required. The ultrasonic sensor 24 may also determine a flow rate and/or a temperature in the chimney.

The measured parameters from each of these sensors 22, 24 is collated by the processor 26 which passes the collated chimney health data 40 to the wireless transmission module 28 of the sensor unit 16. The wireless transmission module 28 transmits this chimney health data 40 to the remote analysis unit 18 which receives the chimney health data 40 via its wireless reception module 30.

Figure 6:
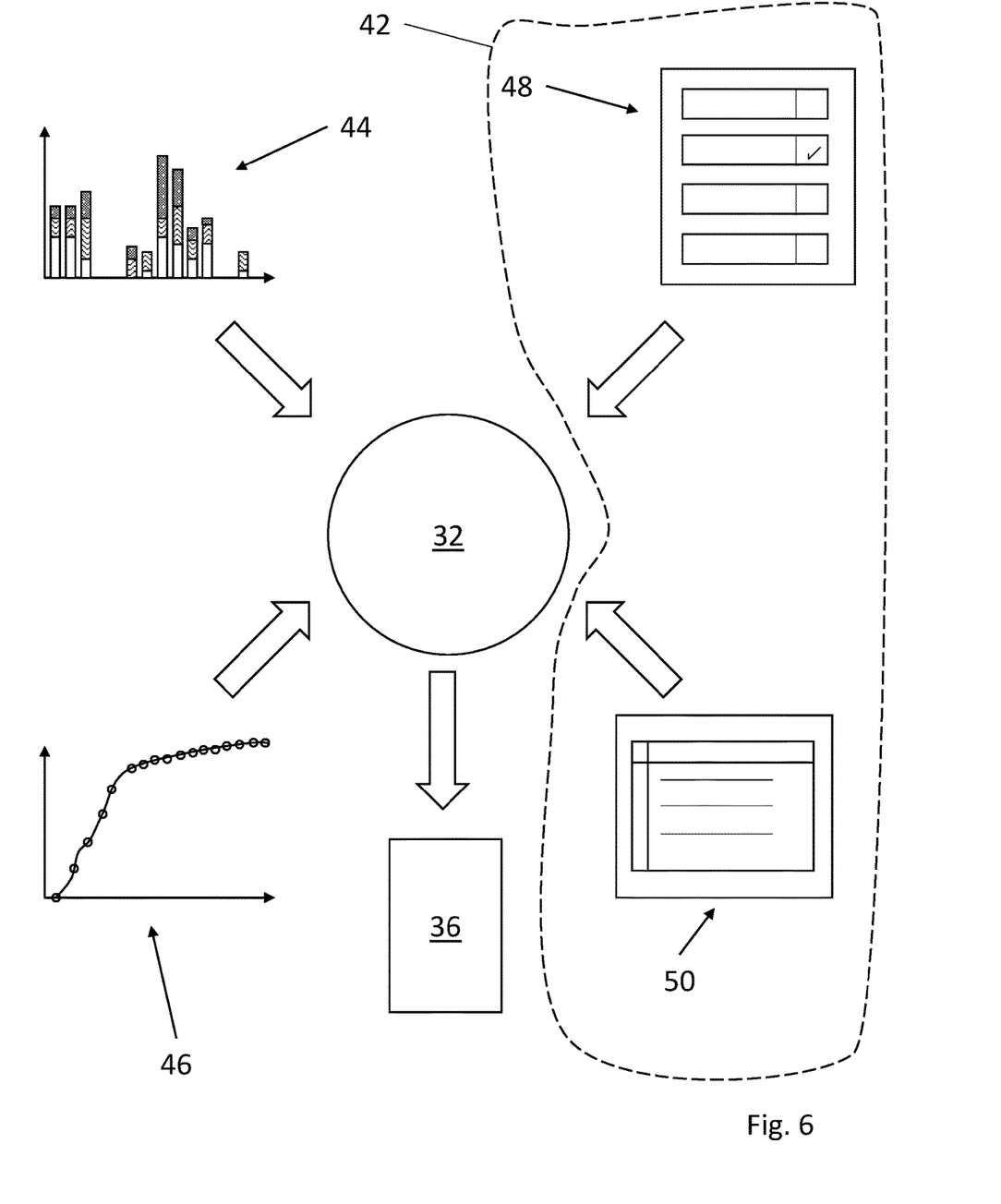
FIG. 6 is a data flow diagram illustrating operation of the remote analysis unit of FIGS. 3. and 4.

The wireless reception module 30 passes the chimney health data 40 to the processor 32 of the remote analysis unit 18. The processor 32 also receives chimney profile data 42 from the memory 34, where this chimney profile data 42 is shown in FIG. 6, which is a data flow diagram illustrating operation of the remote analysis unit 18 of FIGS. 3. and 4.

The data received by the processor 32 includes: firing duration and intensity data 44: temperature profile data 46; fireplace information data 48 (e.g. the model and age of the fireplace); and sweeping history data 50. The firing duration and intensity data 44 and temperature profile data 46 may be received from the sensor unit 16 as chimney health data, while the fireplace information data 48 and sweeping history data 50 may be received from the memory 27 as chimney profile data 42 (as illustrated by the dashed line surrounding this data 48, 50). The processor 32 may also receive historic temperature profile data and/or firing intensity and duration data (not shown).

The processor combines the various data sources, for example using an artificial intelligence (AI) algorithm. For example, a moderate slope on the temperature profile data 46 may indicate that the chimney has a large build-up of deposits on the flue wall (slowing down the rate at which temperature increases proximate to the sensor unit) while a steeper slope may indicate a 'cleaner' chimney. However, there may be some dependence on, for example, the firing intensity and duration that could affect this slope. Analysis of this data over time, together with prior knowledge of the model and/or age of the fireplace, together with information regarding previous sweeping activity (e.g. when it was last swept, how contaminated it was during previous sweeps, etc.), may help to form a conclusion as to the current state of the chimney and how it is changing over time. This is then used by the processor to generate the chimney maintenance schedule 36, which is output by the system as outlined previously.

Thus it will be appreciated by those skilled in the art that embodiments of the present invention provide a networked system in which data relating to the condition and health of the chimney is transmitted to a remote analysis unit that combines this data with prior information that is known in respect of the chimney. Such a system may allow for 'smarter' use of resources by scheduling maintenance based on operational needs rather than according to a general (e.g. fixed) schedule. Although particular embodiments have been described in detail, it will be appreciated by those skilled in the art that many variations and modifications are possible using the principles of the invention set out herein.

The invention claimed is:

1. A sensor network system for determining a chimney maintenance schedule, the sensor network comprising:
    a sensor unit arranged for placement in or proximate to a chimney, wherein the sensor unit comprises at least one sensor arranged to measure a parameter of the chimney and use said measured parameter to generate chimney health data associated with said chimney, said sensor unit further comprising a transmission module arranged to transmit said chimney health data; and
    a remote analysis unit comprising a reception module arranged to receive the chimney health data, said remote analysis unit being arranged to receive chimney profile data associated with the chimney;
    wherein the remote analysis unit is arranged to estimate a chimney health level associated with the chimney from the respective chimney health data and chimney profile data;
    wherein the remote analysis unit determines the chimney maintenance schedule from the estimated chimney health level;
    wherein the sensor unit comprises a temperature sensor and said parameter comprises a temperature profile of the chimney over a time period, the temperature profile providing an indication of the rate at which the temperature changes when a fire is initially lit below the chimney; and
    wherein the indication of the rate at which the temperature changes when a fire is initially lit below the chimney is used to generate the chimney health data, wherein the rate at which the temperature changes is used to assess deposit buildup on a flue wall of the chimney.

2. The sensor network system as claimed in claim 1, wherein the parameter comprises a firing frequency and/or a firing intensity.

3. The sensor network system as claimed in claim 1, wherein the sensor unit comprises an ultrasonic sensor arranged to determine when a contaminant is present within the chimney and/or to measure a thickness of a contaminant within the chimney.

4. The sensor network system as claimed in claim 1, comprising a plurality of sensor units each arranged for placement in or proximate to a respective chimney, wherein each sensor unit comprises at least one sensor arranged to measure a parameter of the respective chimney and use said measured parameter to generate respective chimney health data associated with said chimney, wherein each sensor unit further comprises a respective transmission module arranged to transmit said chimney health data to the remote analysis unit.

5. The sensor network system as claimed in claim 4, comprising:
    a first sensor unit arranged for placement in or proximate to a first chimney on a first building;
    a second sensor unit arranged for placement in or proximate to a second chimney on a second building;
    wherein each of said first and second sensor units respectively comprises at least one sensor arranged to measure a parameter of the respective chimney and use said measured parameter to generate chimney health data associated with said respective chimney, each sensor unit further comprising a transmission module arranged to transmit said chimney health data.

6. The sensor network system as claimed in claim 1, wherein the transmission and reception modules are arranged to communicate over a building to building network, a cellular network, a Bluetooth® communication link or a Wi-Fi™ network.

7. The sensor network system as claimed in claim 1, wherein the sensor network comprises a mesh network.

8. The sensor network system as claimed in claim 1, wherein the chimney profile data comprises information regarding what type of source is connected to the chimney.

9. The sensor network system as claimed in claim 1, wherein the chimney profile data comprises a sweeping history for the chimney.

10. The sensor network system as claimed in claim 1, arranged to generate an alarm when a difference between the estimated chimney health level and a target chimney health level exceeds a threshold value.

11. The sensor network system as claimed in claim 1, arranged to generate an emergency alarm signal when the parameter of the chimney exceeds a threshold.

12. The sensor network system as claimed in claim 1, wherein the remote analysis unit is arranged to estimate an emission level from the chimney health data and/or the chimney profile data.

13. The sensor network system as claimed in claim 1, comprising one or more sensor units arranged to measure environmental data, wherein the environmental data comprises one or more of the following selected from the group consisting of: an air quality parameter; a concentration of a pollutant; and a concentration of an air particulate.

14. The sensor network system as claimed in claim 1, wherein the remote analysis unit is arranged to estimate a fire risk level from the chimney health data and/or the chimney profile data.

15. The sensor network system as claimed in claim 1, wherein the sensor unit is battery powered or connected to a solar power panel.

16. A sensor unit arranged for placement in or proximate to a chimney, wherein the sensor unit comprises:
  at least one sensor arranged to measure a parameter of the chimney and use said measured parameter to generate chimney health data associated with said chimney; and
  a transmission module arranged to transmit said chimney health data to a remote analysis unit;
  wherein the sensor unit comprises a temperature sensor and said parameter comprises a temperature profile of the chimney over a time period, the temperature profile providing an indication of the rate at which the temperature changes when a fire is initially lit below the chimney; and
  wherein the indication of the rate at which the temperature changes when a fire is initially lit below the chimney is used to generate the chimney health data, wherein the rate at which the temperature changes is used to assess deposit buildup on a flue wall of the chimney.

17. A method of operating a sensor network system for determining a chimney maintenance schedule, the sensor network comprising a sensor unit comprising at least one sensor and a transmission module, and a remote analysis unit comprising a reception module, the method comprising:
  measuring a parameter of the chimney using the sensor;
  using said measured parameter to generate chimney health data associated with said chimney;
  transmitting said chimney health data using the transmission module;
  receiving the chimney health data using the reception module;
  receiving chimney profile data associated with the chimney;
  estimating a chimney health level associated with the chimney from the respective chimney health data and chimney profile data; and
  determining the chimney maintenance schedule from the estimated chimney health level;
  wherein the sensor unit comprises a temperature sensor and said parameter comprises a temperature profile of the chimney over a time period, the temperature profile providing an indication of the rate at which the temperature changes when a fire is initially lit below the chimney; and
  wherein the indication of the rate at which the temperature changes when a fire is initially lit below the chimney is used to generate the chimney health data, wherein the rate at which the temperature changes is used to assess deposit buildup on a flue wall of the chimney.

* * * * *